(12) United States Patent
Satoh et al.

(10) Patent No.: US 6,936,206 B1
(45) Date of Patent: Aug. 30, 2005

(54) SYNTHETIC RESIN MOLDING MOLD, APPARATUS FOR AND METHOD OF ADJUSTING A TEMPERATURE OF THE MOLD

(75) Inventors: Yosihisa Satoh, Tochigi (JP); Akihiko Imagawa, Aichi (JP); Masahiko Yamaki, Aichi (JP); Masataka Takamura, Aichi (JP); Masayuki Nunome, Aichi (JP); Kazumi Shinto, Aichi (JP)

(73) Assignees: Mitsui Chemicals, Inc., Tokyo (JP); Ono Sangyo Co., Ltd., Tokyo (JP)

( * ) Notice: Subject to any disclaimer, the term of this patent is extended or adjusted under 35 U.S.C. 154(b) by 0 days.

(21) Appl. No.: 09/720,676

(22) PCT Filed: Apr. 28, 2000

(86) PCT No.: PCT/JP00/02800

§ 371 (c)(1),
(2), (4) Date: Dec. 29, 2000

(87) PCT Pub. No.: WO00/67979

PCT Pub. Date: Nov. 16, 2000

(30) Foreign Application Priority Data

May 6, 1999 (JP) .................................. 11-126426
Dec. 28, 1999 (JP) .................................. 11-375069

(51) Int. Cl.[7] .......................... B29C 45/16; B29C 45/03
(52) U.S. Cl. ...................... 264/255; 264/347; 264/348; 425/120; 425/127; 425/129.1; 425/547; 425/552; 425/555
(58) Field of Search ................................ 264/255, 347, 264/348; 425/120, 127, 129.1, 547, 552, 425/555

(56) References Cited

FOREIGN PATENT DOCUMENTS

| JP | 45-22020 | 7/1970 |
|----|----------|--------|
| JP | 51-22759 | 2/1976 |
| JP | 55-109639 | 8/1980 |
| JP | 56-37108 | 4/1981 |
| JP | 56-552190 | 5/1981 |
| JP | 57 165229 | 10/1982 |
| JP | 58-12739 | 1/1983 |
| JP | 58-215309 | 12/1983 |
| JP | 60-54828 | 3/1985 |
| JP | 60-141953 | 9/1985 |
| JP | 61-79614 | 4/1986 |
| JP | 62-208918 | 9/1987 |
| JP | 64-42217 | 2/1989 |

(Continued)

*Primary Examiner*—Edmund H. Lee
(74) *Attorney, Agent, or Firm*—Burns, Doane, Swecker & Mathis, LLP

(57) ABSTRACT

There is provided an arrangement of a mold including a mold base (1), a cavity block (2) provided within the mold base (1), a heat insulating layer (5) provided between the mold base (1) and the cavity block (2), and a system of a flow passage (A) through which a heating medium and a cooling medium are alternately and repeatedly supplied, wherein a space is provided at a contact portion between the cavity block (2) and the mold base (1) based on anticipation of a thermal expansion of the cavity block (2). Further, the cavity block (2) may be arranged to have inlet and outlet slots communicating with the channel (A), and the inlet and outlet slots may be attached with conduits thermally insulated from the mold base (1).

35 Claims, 9 Drawing Sheets

FOREIGN PATENT DOCUMENTS

| | | |
|---|---|---|
| JP | 01-269515 | 10/1989 |
| JP | 04-265720 | 9/1992 |
| JP | 04-351526 | 12/1992 |
| JP | 05-318527 | 12/1993 |
| JP | 07-024890 | 1/1995 |
| JP | 07-100867 | 4/1995 |
| JP | 08-103931 | 4/1996 |
| JP | 08-290459 | 11/1996 |
| JP | 09-193223 | 7/1997 |
| JP | 9-314611 | 9/1997 |
| JP | 10-034657 | 2/1998 |
| JP | 11-042650 | 2/1999 |
| JP | 11-048290 | 2/1999 |

SYNTHETIC RESIN MOLDING MOLD, APPARATUS FOR AND METHOD OF ADJUSTING A TEMPERATURE OF THE MOLD

TECHNICAL FIELD

The present invention relates to a mold for use for an injection molding or compression molding with a thermoplastic resin or a thermosetting resin, and more particularly to a synthetic resin molding mold, an apparatus for and a method of adjusting a temperature of the mold in which a cavity surface is alternately heated and cooled.

BACKGROUND ART

In general, when a thermoplastic resin is molded by an injection molding or compression molding, in order to avoid elongation of time in a molding cycle due to change in temperature of the mold, molding is carried out at a marginal temperature range which barely permits the melt to be filled into the mold and the product taken out from the mold without deformation.

Further, when a thermoplastic resin is subjected to an injection molding, if the temperature of the mold is kept at a high temperature upon filling the melt into the mold, since the fluidity of the resin is improved, it becomes possible to take an advantage in forming the product into a thin-walled product as well as in improving replication property, i.e., how well the shape of the cavity surface is replicated to the surface of the product. In addition, a weld line becomes not conspicuous. Thus, many inventions have been made on a matter that heat is exclusively applied to the cavity surface during injection of the melt into the mold.

For example, a method in which heating is effected by heated air is disclosed in Japanese Examined Patent Publication Gazette No. 22020/1970; a method of combination in which heating is effected by an electric heater and cooling by cooled water is disclosed in Japanese Patent Laid-open Publication Gazette No. 22759/76; a method in which heating is effected by high frequency induction is disclosed in Japanese Patent Laid-open Publication Gazette No. 109639/1980; a method in which heating is effected by supplying steam into a cavity is disclosed in Japanese Patent Laid-open Publication Gazette No. 165229/1982; a method in which heating is effected by interposing a heated plate between a cavity and a core is disclosed in Japanese Patent Laid-open Publication Gazette No. 79614/1986; a method in which heating is effected by a halogen bulb is disclosed in Japanese Patent Laid-open Publication Gazette No. 42217/1989; and a method in which heating is effected on a cavity surface by an electricity conducting layer is disclosed in Japanese Patent Laid-open Publication Gazette No. 265720/1992.

Further, a method in which heating is effected by supplying a heating medium such as steam, hot water or hot oil into a circuit commonly utilized to a cooling medium is disclosed in Japanese Patent Laid-open Publication Gazettes No. 55219/1981, No. 12739/1983, No. 54828/1985, and No. 193223/1997. Furthermore, as an improvement of the above proposals, a method in which heating is effected by using two piping systems of heating medium circuit is disclosed in Japanese Patent Laid-open Publication Gazette No. 100867/1995, a method in which heating medium and cooling medium are independently supplied from respective tanks and recovered to the same is disclosed in Japanese Patent Laid-open Publication Gazette No. 215309/1983; a method in which a piping system is arranged so that a portion of the circuit commonly utilized by the heating medium and cooling medium is made small as far as possible is disclosed in Japanese Patent Laid-open Publication Gazette No. 208918/1987; a method in which a medium is heated amid the circuit of the medium only when a mold is to be heated, is disclosed in Japanese Patent Laid-open Publication Gazette No. 269515/1989; and a method in which heating is effected by heated water flowing through a closed loop is disclosed in Japanese Patent Laid-open Publication Gazette No. 37108/1981.

The above-described method in which heating is effected by heated air suffers from a problem that a heating capacity is small. The method in which heating is effected by an electric heater and the method in which the cavity surface is heated by an electricity conducting layer encounters a problem that the apparatus thereof becomes complicated and expensive. The method in which heating is effected by high frequency induction also encounters a problem that it takes a lot of time to insert or take out a heating device and the apparatus thereof becomes expensive. The method in which steam is supplied into the cavity encounters a problem that the method is applicable only to a situation where a cavity becomes wet will not cause any problem. The method in which the heated plate is interposed between the cavity and the core and the method in which heating is effected by a halogen bulb, suffer from a problem that it takes a lot of time to insert or take out a heating device, in addition to time to take off a product.

Furthermore, the method in which heating and cooling are effected by using a common circuit encounters the following problem. That is, if the circuit is remote from a cavity surface, then the mold is heated and cooled not only at the surface portion but also at the deep portion of the mold, and hence heating and cooling are excessively carried out, with the result that it takes a lot of time for switching between the heating mode and the cooling mode, and responsibility in heating and cooling becomes deteriorated.

Further, according to the method in which heating is effected by using two piping systems of heating medium fluid passage as an improvement of the above-described method, a first heating medium channel provided near a cavity surface is supplied with a heating medium upon heating the mold and supplied with a cooling medium upon cooling the mold while a second heating medium channel provided at a place remote from the cavity surface is supplied with a heating medium, cooling medium or air upon heating the mold and supplied with a cooling medium upon cooling the mold, whereby it is intended to shorten a molding time. However, the second heating medium channel hardly achieves the intended purpose and rather the arrangement causes a problem that it takes a lot of processes in forming the fluid passage within the mold.

According to the other improvements, i.e., the method in which the heated medium and the cooled medium are independently supplied from respective tanks and recovered to the same, the method in which the portion of the circuit commonly utilized by the heated medium and cooled medium is made small as far as possible, the method in which the medium is heated amid the circuit of the medium only when a mold is to be heated, and the method in which heating is effected by heated water flowing through a closed loop, are not intended to improve the heating and cooling system within the mold but such one that the heating and cooling system within the mold is left unchanged from a conventional arrangement but a portion other than the mold is improved to shorten the molding cycle.

Accordingly, an object of the present invention is to provide a synthetic resin molding mold in which it becomes possible with ease to carry out switching between the heating mode and the cooling mode for heating and cooling a cavity surface within the mold with a short period of time.

Another object of the present invention is to provide a synthetic resin molding mold from which it becomes possible to obtain a product without any deformation and surface defect.

Further object of the present invention is to provide a synthetic resin molding mold in which it becomes possible to avoid fatigue of the mold caused by the switching between the heating mode and the cooling mode of the mold.

Still further object of the present invention is to provide a synthetic resin molding mold in which it becomes possible to lessen a heating flow to a mold base while quickening the increase in temperature of the cavity surface.

DISCLOSURE OF THE INVENTION

According to the present invention, there is provided a synthetic resin molding mold including a mold base, a cavity block provided within the mold base, a heat insulating layer provided between the mold base and the cavity block, and a channel arranged near the cavity surface of the cavity block through which a heating medium and a cooling medium are alternately and repeatedly supplied, wherein a space is provided at a contact portion between the mold base and the cavity block based on the anticipation of a thermal expansion of the cavity block.

When the melt is injected into the cavity, the heating medium is supplied to the channel provided within the cavity block, and thereafter the cooling medium is supplied to the channel for cooling a product molded within the cavity. In this way, it becomes possible to make the product taken out from the cavity free from a deformation and a surface defect. As a heat insulating layer is provided between the mold base and the cavity block, heating and cooling can be more intensively effected on the cavity block, with the result that a time period it takes for heating and cooling the cavity block can be shortened and responsibility in heating and cooling can be improved. Moreover, according to the arrangement of the present invention, a space is provided at the contact portion between the mold base and the cavity block based on the anticipation of a thermal expansion of the cavity block. Therefore, even if the cavity block is expanded, the mold can be protected from an internal thermal stress, with the result that the mold base and the cavity block can be used free from fatigue.

Further, according to the arrangement of the present invention, the cavity block has provided therein inlet and outlet slots communicating with the channel, and the inlet and outlet slots are attached with conduits thermally insulated from the mold base. With the above arrangement, it becomes possible to lessen a heating flow to the mold base while quickening the increase in temperature of the cavity.

BEST MODE FOR CARRYING OUT THE INVENTION

The present invention will hereinafter be described in detail with reference to attached drawings.

Figure 1:
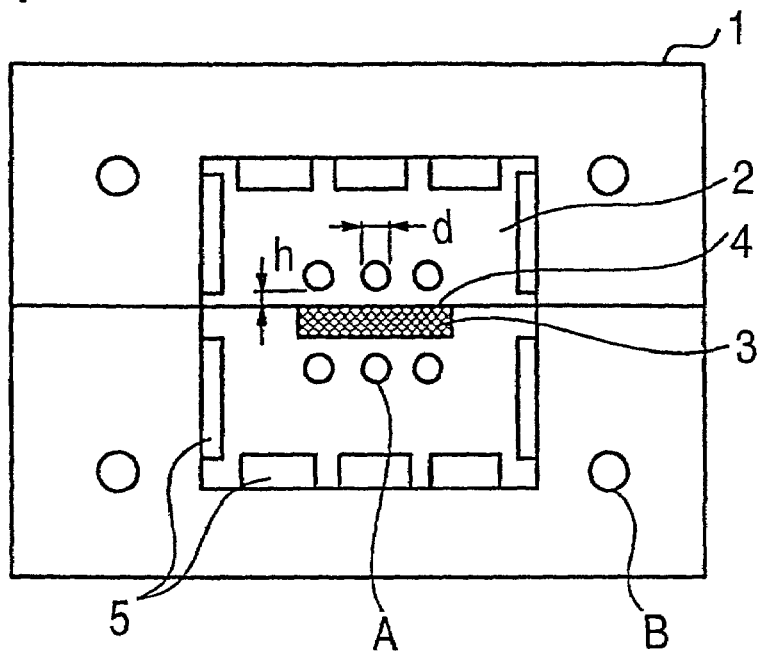
FIG. 1 is a diagram schematically showing a cross section of a synthetic resin molding mold according to the present invention.
Figure 2:
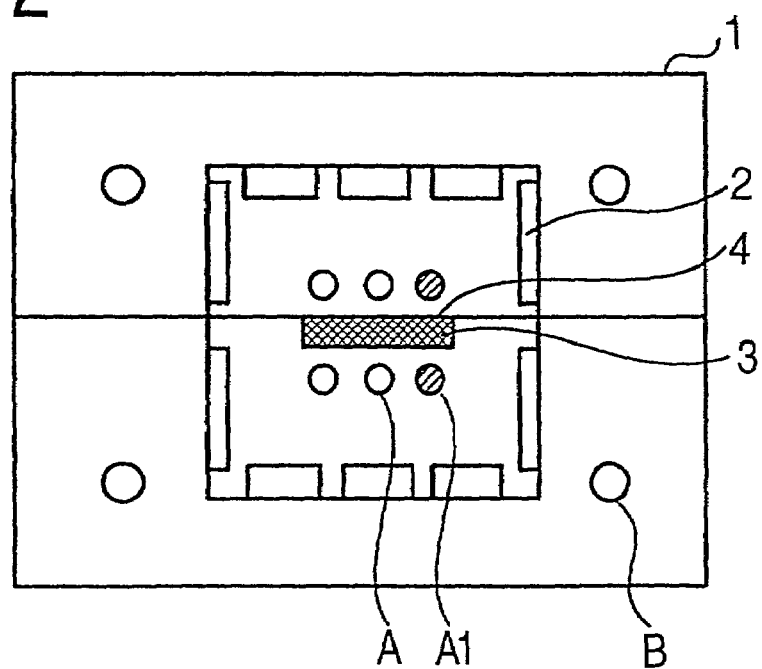
FIG. 2 is a diagram schematically showing a cross section of a synthetic resin molding mold in which provided is a channel which is utilized for supplying a cooling medium exclusively.

FIG. 1 is a diagram schematically showing a cross section of a synthetic resin molding mold according to the present invention. As shown in FIG. 1, the molding mold is composed of mold base 1 and cavity block 2 provided in the mold base 1. Cavity block 2 is arranged to form cavity 3. A system of channel A through which a heating medium and a cooing medium are alternately and repeatedly supplied is provided near cavity surface 4. As shown in FIG. 2, if channel A1 through which a cooling medium is constantly supplied is provided together with channel A through which the heating medium and the cooing medium are alternately and repeatedly supplied, the arrangement will be advantageous when only a local part of the cavity is to be cooled.

Hydraulic equivalent diameter d of channel A is set to 3 to 6 mm. Distance h between cavity surface 4 to a surface of channel A and A1 is set to 1 to 10 mm. Further, as the heating medium, saturated steam, over-heated steam, pressurized water, and hot water are utilized. As the cooling medium, cooled water is utilized.

As described above, according to the present invention, since cavity block 2 is provided with channel A, manufacturing of channel A becomes easy as compared with when the channel is directly formed within a mold base without using cavity block. Therefore, it becomes possible to manufacture channel A in which the medium can be prevented from being stagnant and temperature distribution of the cavity surface becomes uniform. Further, if channel A is provided at only a necessary portion and other channels are utilized as channel A1, then it is expected to shorten the cooling process. Furthermore, if a portion necessary to be heated and cooled within the mold is arranged as cavity block 2, then the mold can be heated and cooled partly with ease.

According to the arrangement of the present invention, heat insulating layer 5 formed of air is provided between cavity block 2 and mold base 1. Heat insulating layer 5 may be formed of any material other than air having a low thermal conductivity. Owing to heat insulating layer 5, cavity block 2 can be thermally insulated from mold base 1, and hence the mold can be controlled in terms of temperature with a small amount of heat load, with the result that cavity surface 4 of cavity block 2 can be heated or cooled with a quick heat response. Moreover, mold base 1 is provided with circuit B through which a cooling medium is constantly supplied. Circuit B is provided for controlling the temperature of the mold base. Owing to the arrangement of the circuit B, the entire mold can be free from influence of the temperature change of cavity surface 4, with the result that when closing the molding mold, it becomes possible to avoid galling caused by thermal expansion difference between a movable mold half and a stationary mold half. While the above arrangement is made to have heat insulating layer 5, the layer 5 may not be provided depending on the design of the mold. Further, while in the arrangement mold base 1 is divided into the movable mold half and the stationary mold half and each of the mold halves has cavity block 2 and each of cavity blocks 2 has channel A formed therein, channel A may be provided within only one of the cavity blocks.

When a flat-plate product is to be molded, it is desirable to additionally provide the channel through which the heating medium and the cooling medium are alternately and repeatedly supplied, outside the cavity surface 3. Without the channel, the cavity will suffer from temperature decrease near the side portion of the cavity due to a heat flow from the inside to the outside of the side face of the cavity.

Figure 3:
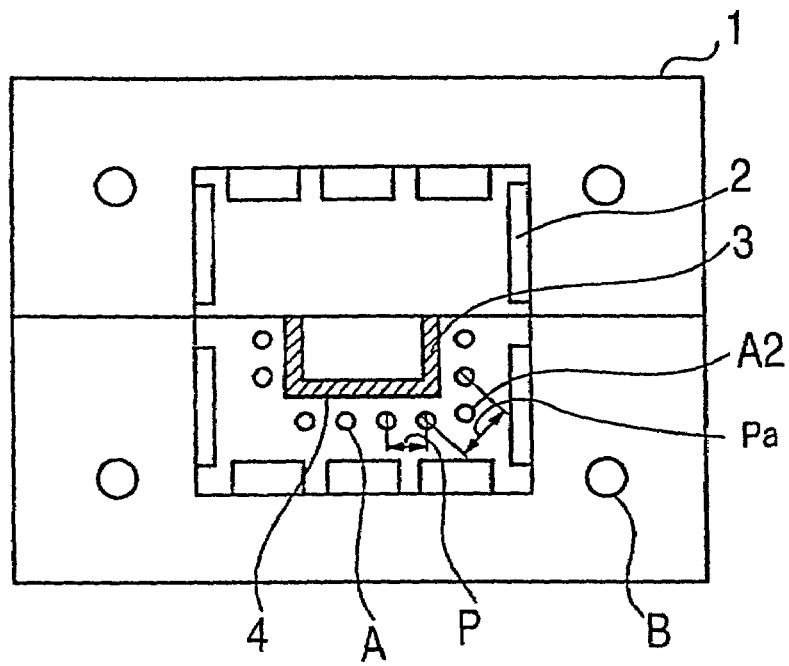
FIG. 3 is a diagram schematically showing a cross section of a mold in which a channel is provided near a side wall surface.

If a molding product has a cubic shape with a side wall surface and a bottom wall surface, and the channel through which the heating medium and the cooling medium are alternately and repeatedly supplied, are arranged as two groups of channels and provided near the cavity surface contacting the side wall surface and the bottom wall surface of the cubic product, respectively, as shown in FIG. 3, it is desirable that distance Pa from the nearest channel of one channel group to the nearest channel of the other channel group is made smaller than pitch P at which the channels are arranged in each channel group. If distance Pa exceeds pitch P, it is preferable to additionally provide a channel at an intersection or inside of the intersection of the array of the channels along the bottom wall surface and the array of the channels along the side wall surface of the cubic cavity. Without channel A2, cavity 3 will suffer from temperature decrease near the corner of cavity 3.

Figure 4:
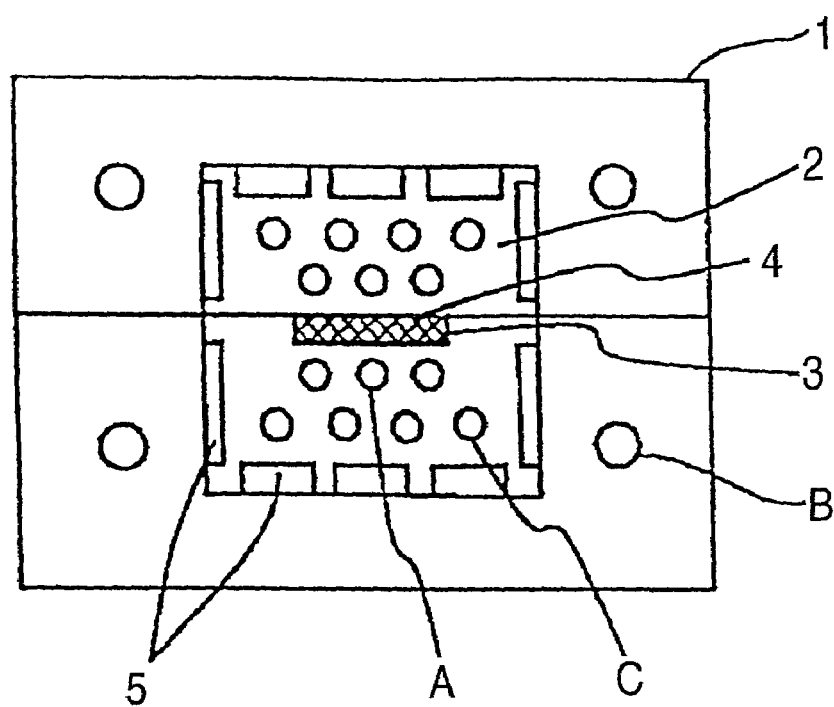
FIG. 4 is a diagram schematically showing a cross section of a synthetic resin molding mold having a cavity block in which two arrays of channels are provided.

FIG. 4 is a diagram schematically showing a cross section of a synthetic resin molding mold having a cavity block in which two arrays of channels are provided.

As shown in the figure, the mold of the present embodiment has two groups of channels. That is, one of the channel groups is composed of channels A through which the heating medium and the cooling medium are alternately and repeatedly supplied, and provided near cavity surface 4 of cavity block 2. The other of the channel groups is composed of channel C through which the cooling medium is constantly supplied, and provided in a portion remote from cavity surface 4. Further, mold base 1 is arranged to have circuit B through which a cooling medium is constantly supplied, and heat insulating layer 5 is provided between cavity block 2 and mold base 1. Channel A may be provided at a part of the cavity block near the cavity and channel C may be provided at a portion corresponding to a portion where channel A is not provided. In this case, channel C may be provided over an area wider than the portion corresponding to the portion where channel A is not provided. Alternatively, channel C may be provided over the entire area of the cavity block. Channel C may not be supplied with a cooling medium or may be held under an atmospheric pressure.

As described above, if cavity block 2 is arranged to have channel A through which the heating medium and the cooling medium are alternately and repeatedly supplied, then expansion is caused on cavity block 2, leading to thermal stress within the molding mold, with the result that cavity block 2 and mold base 1 suffer from fatigue. For this reason, it is necessary for cavity block 2 and mold base 1 to be brought into a contiguous relationship with each other, or to be brought into intimate contact with each other by a little thermal stress, during which time a melt resin is injected.

Figure 5:
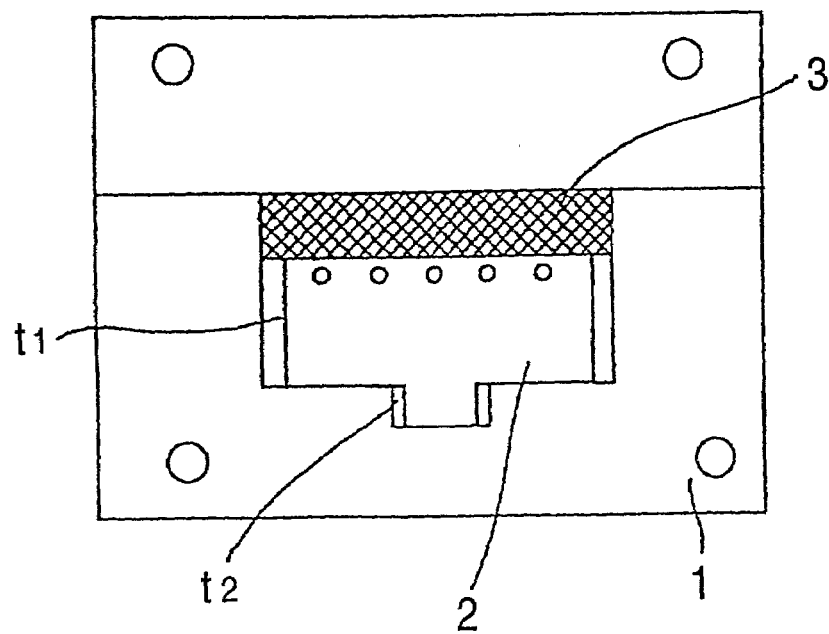
FIG. 5 is a diagram showing a mold including a cavity block having a contact portion with a space.

To this end, as shown in FIG. 5, space t1 is provided between cavity block 2 and mold base 1 at a contact portion thereof based on the anticipation of thermal expansion of cavity block 2. Space t1 is determined such that thermal stress caused by the expansion of cavity block 2 is to be lower than 200 MPa, preferably lower than 100 Ma, more preferably lower than 50 MPa.

If space t1 is provided at the contact portion between cavity block 2 and mold base 1, a clearance between cavity block 2 and mold base 1 becomes too large when the molds are maintained at a low temperature. Thus, cavity block 2 may be shifted relative to mold base 1 when the mold is heated or cooled. According to the present arrangement, a fixing portion is provided between a contact portion of cavity block 2 and mold base 1 together with gap t2 which is smaller than space t1. Gap t2 of the fixing portion is set to 1 to 30 $\mu$m, preferably to 1 to 20 $\mu$m, more preferably to 1 to 10 $\mu$m.

Figure 6:
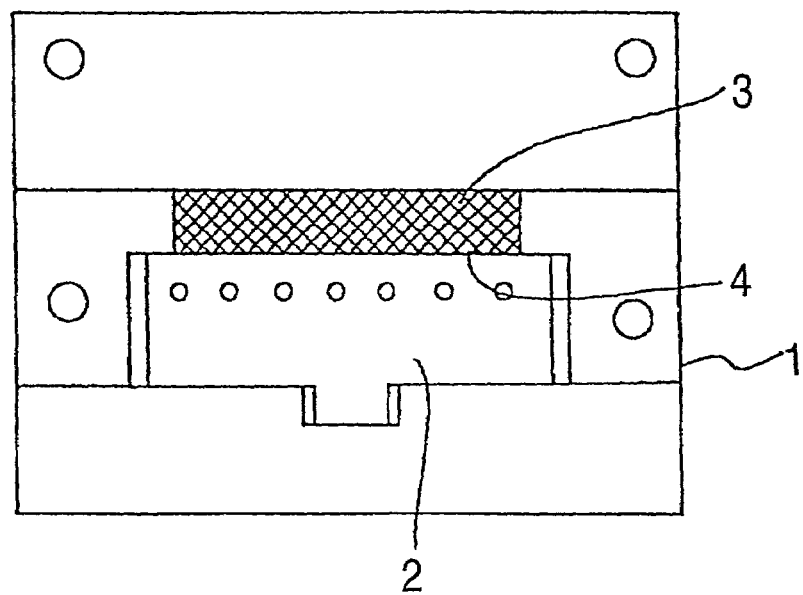
FIG. 6 is a diagram illustrating a relationship between the contact portion and a cavity forming portion of the cavity block.

Further, depending on the shape of the cavity, as shown in FIG. 6, cavity block 2 is designed such that the contact portion of cavity block 2 is remote from the cavity. More concretely, cavity block 2 is designed such that the surface of cavity block 2 is larger than cavity surface 4 formed by cavity block 2.

The above-described countermeasure against thermal expansion of the cavity block can be similarly applied to a mold having a slide core which will be described below.

Figure 7A:
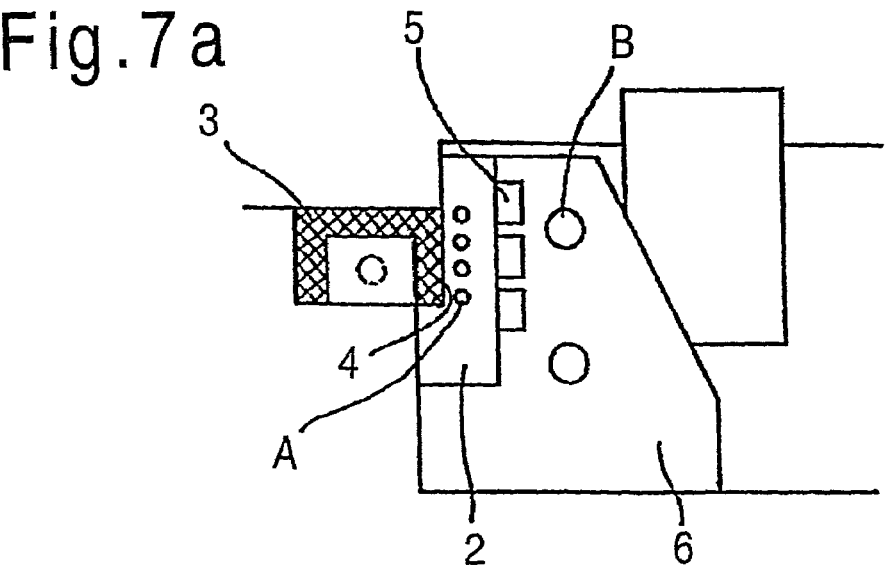
FIG. 7a is a front view of a mold having a slide core.
Figure 7B:
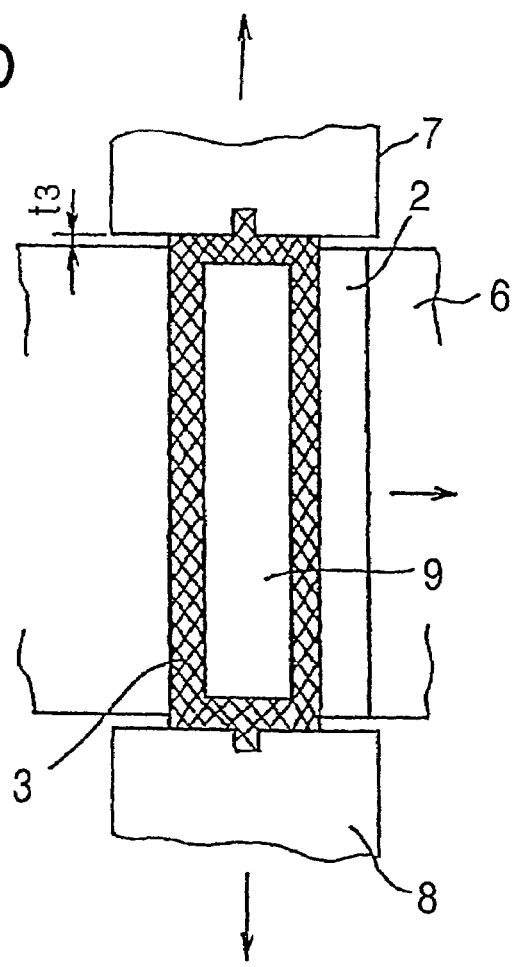
FIG. 7b is a plan view of the same.
Figure 7C:
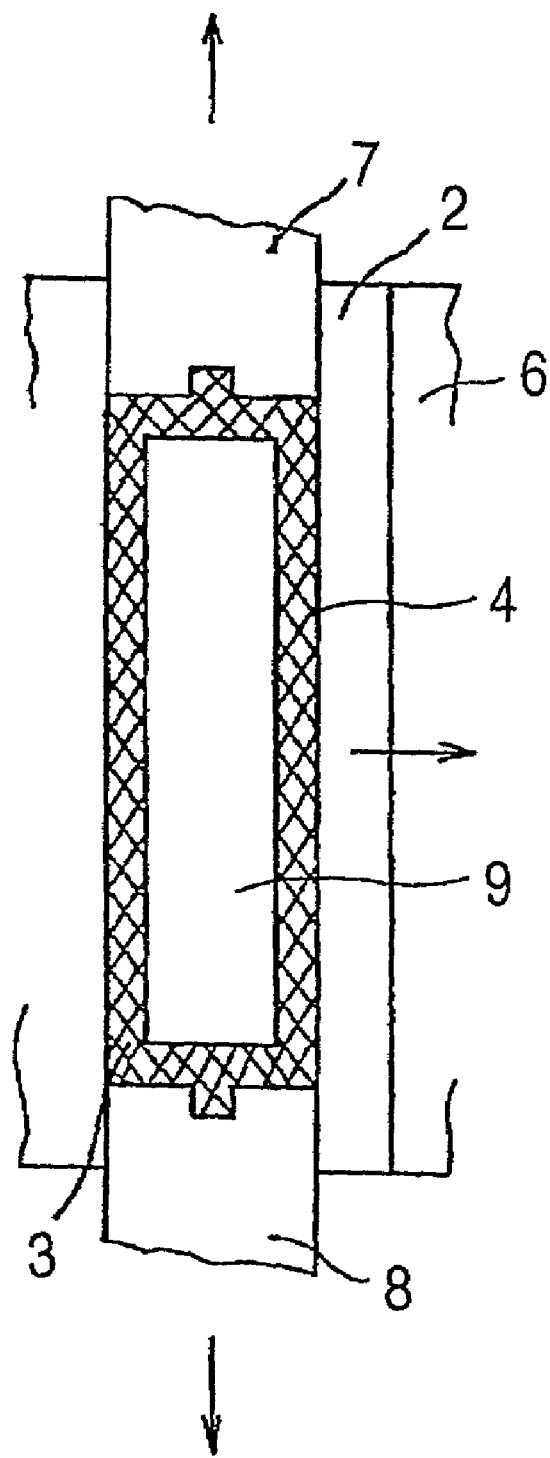
FIG. 7c is a plan view of a modification of the same.

FIG. 7a is a front view of a mold having a slide core, FIG. 7b is a plane of the same, and FIG. 7c is a plane view of a modification of the same.

As shown in FIG. 7a, first slide core 6 provided on the side of cavity 3 is arranged to have cavity block 2 provided within first slide core 6. Cavity block 2 is arranged to have channel A through which the heating medium and the cooling medium are alternately and repeatedly supplied, at a portion near cavity surface 4. Heat insulating layer 5 is provided between cavity block 2 and first slide core 6. Further, first slide core 6 is arranged to have circuit B through which a cooling medium is constantly supplied.

As shown in FIG. 7b, at both the ends of cavity 3 in the longitudinal direction thereof, there are provided second and third slide cores 7 and 8, whereby the ends of cavity 3 are defined.

According to the above molding mold, space t3 is provided at a contact portion of cavity block 2 and second and third slide cores 7 and 8 based on expansion of cavity block 2.

According to the arrangement of the modification shown in FIG. 7c, second and third slide cores 7 and 8 are designed to have a small width and a surface of cavity block 2 is made larger than cavity surface 4 which is formed by cavity block 2, whereby cavity block 2 is prevented from abutting against second and third slide cores 7 and 8 even if cavity block 2 is expanded.

Figure 8:
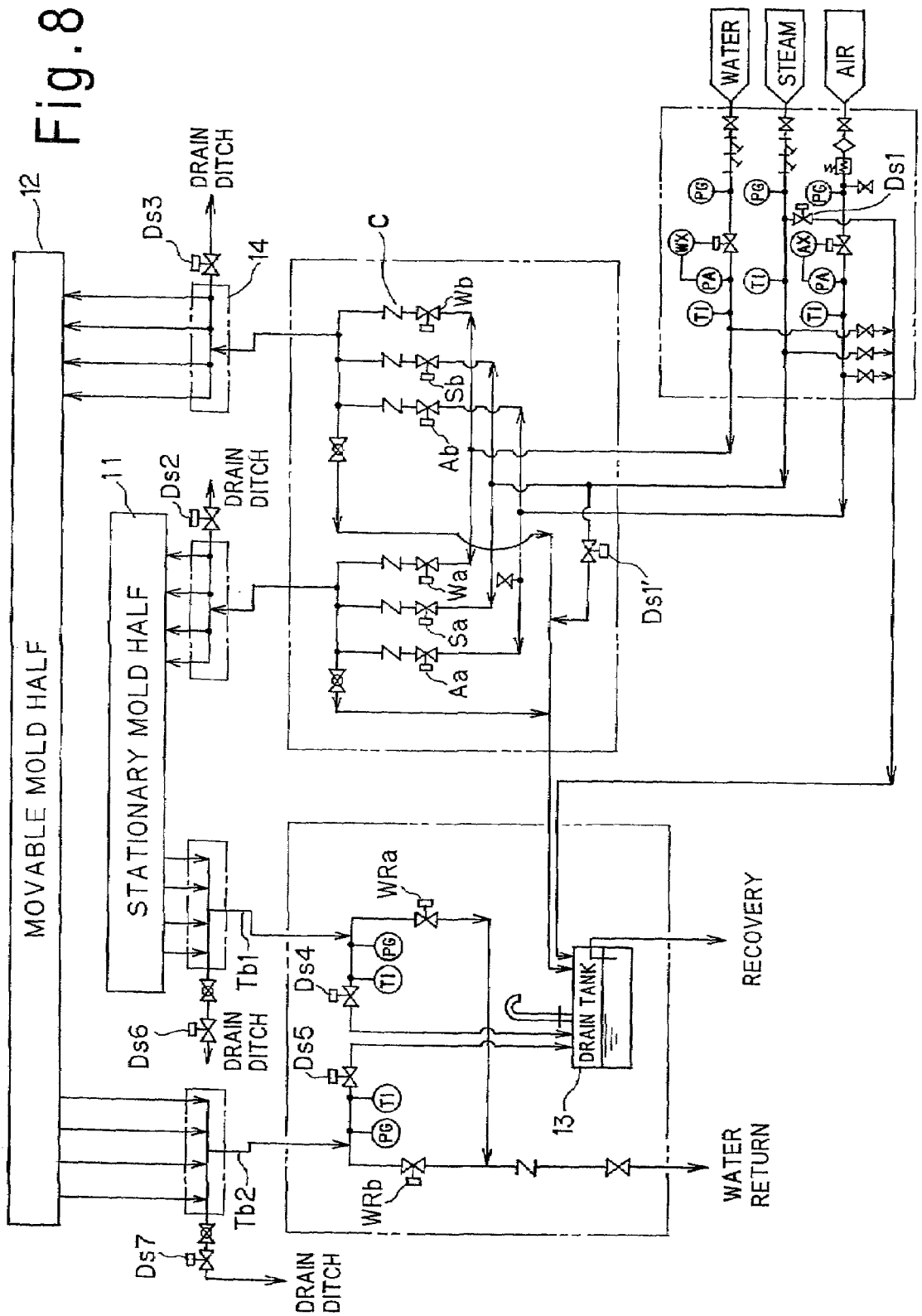
FIG. 8 is a diagram of a piping system for supplying a heating medium and a cooling medium into cavity blocks which are provided within a movable mold half and a stationary mold half.

FIG. 8 is a diagram of a piping system for supplying a heating medium and a cooling medium into a cavity block which is provided within a stationary mold half 11 and a movable mold half 12. As shown in the figure, a heating medium and a cooling medium are alternately and repeatedly supplied to channels which are provided near the cavity surface of the cavity blocks within the stationary mold half 11 and the movable mold half 12. To this end, the piping system includes upstream side switching valves (hereinafter referred to as an inlet switching valve) Sa, Wa, Aa, Sb, Wb, and Ab on the upstream side of a fluid passage inlet. The piping system also includes downstream side switching valves (hereinafter referred to as an outlet switching valve) Ds4, WRa, Ds5, WRb on the downstream side of a fluid passage outlet. The inlet switching valves and the outlet switching valves are preferably disposed at a place distant from the fluid passage inlet and the fluid passage outlet, respectively, by 3 m or less. The piping system further includes steam pressure regulating valves Ds6 and Ds7 and medium temperature detecting sensors Tb1 and Tb2 provided near the fluid passage outlet on the upstream side relative to outlet switching valves Ds4, WRa, Ds5, and WRb on the downstream side. Pressure regulating valves Ds6 and Ds7 are connected at the drain side thereof to a drain ditch. Outlet switching valves Ds4 and Ds5 may be an automatic pressure regulating valve so that they have a pressure regulating function the same as pressure regulating valves Ds6 and Ds7.

According to the above embodiment of the present invention, saturated steam of 1 MPa (G) at maximum and 190° C. is utilized as the heating medium, cooled water of 0.5 MPa (G) at maximum and 10 to 95° C. is utilized as the cooling medium, and air of 0.7 MPa (G) at maximum is utilized as the gas. It is natural to say that the present invention is not limited to the embodiments in which the above described pressures and temperatures are selected.

Pressure regulating valves Ds6 and Ds7 can be adjusted to decrease pressure loss in the fluid passage within the mold so that dispersion of the steam pressure distribution is lessened within the fluid passage and that difference between the cavity surface temperature near the fluid passage inlet and the cavity surface temperature near the fluid passage outlet is lessened. Further, according to the above arrangement, condensed water in the fluid passage within the mold can be drained while the steam pressure within the mold is maintained high. Therefore, the temperature of the saturated steam can be maintained high, the heat conductivity of the steam on the wall of the fluid passage within the mold can be improved, and heating capability is enhanced.

In the flow passage between inlet switching valves Sa, Wa, Aa, Sb, Wb, and Ab on the upstream side to the fluid passage inlet, there are provided drain exhaust valves Ds2 and Ds3. Further, in the fluid passage on the upstream side of steam inlet switching valves Sa and Sb, there are provided drain exhaust valves Ds1 and Ds1', and the exhaust sides thereof are respectively connected to drain tank 13. Conduit members 14 may be provided at the fluid passage inlet and the fluid passage outlet, and conduit members 14 may be connected with exhaust valves Ds2 and Ds3 and pressure regulating valves Ds6 and Ds7. Further, in the flow passage between the inlet switching valve and the outlet switching valve, at least one inlet valve may be provided for introducing a purging gas. That is, if air or the like is separately introduced to discharge cooling water or the like within the piping system, then the cycle time of the molding process can be shortened.

If inlet switching valves Sa, Wa, Aa, Sb, Wb, and Ab on the upstream side are arrayed in the vertical direction and steam, cooling water and air are supplied from the lower side to the upper side of the piping system, then the cooling water can be flowed into the upper side of the steam inlet switching valves Sa and Sb upon switching supplied fluid from steam to cooling water. Which fact can cause abrupt temperature change, leading to damage in steam inlet switching valves Sa and Sb. In order to avoid such damage, it is desirable to supply air to the downstream side of the inlet switching valve before the cooling water is introduced therein. If such scheme is effected, an air reservoir is formed at the upper portion of steam inlet switching valves Sa and Sb, which prevents the cooling water from direct contact to the steam, with the result that steam inlet switching valves Sa and Sb can be protected from damage. Further, based on the similar purpose, it is preferable to provide check valve C on the downstream side of steam inlet switching valves Sa and Sb.

Figure 9:
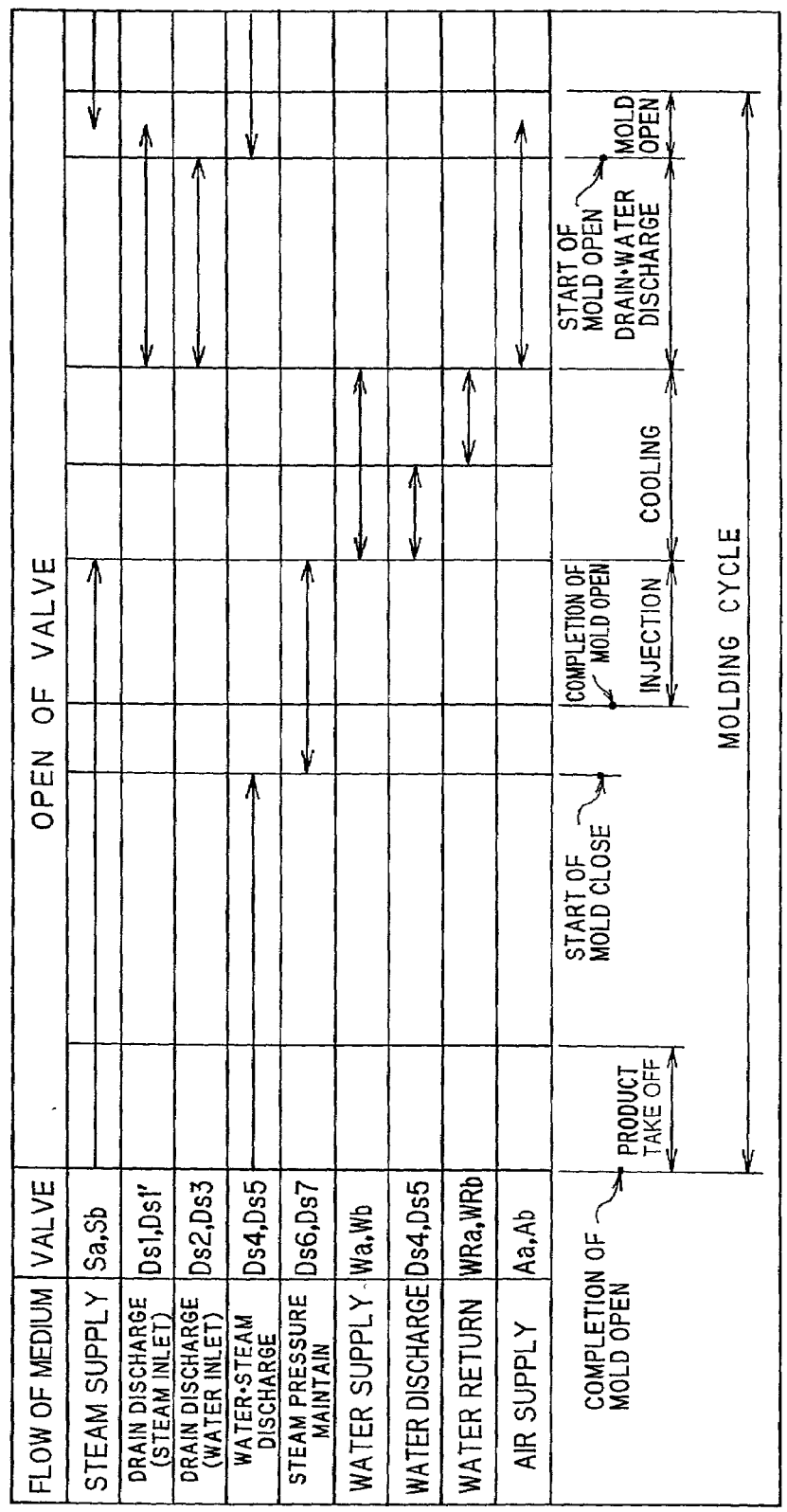
FIG. 9 is an operation chart of the piping system for supplying a heating medium and a cooling medium.

The heating and cooling fluid passage will be described with reference to FIGS. 8 and 9.

Initially, before the mold is opened, air inlet switching valves Aa and Ab on the upstream side and exhaust valves Ds2 and Ds3 are opened to drain cooled water within the fluid passage on the upstream side. At the same time, drain exhaust valves Ds1 and Ds1' on the upstream side are opened to discharge drain within the fluid passage.

Thereafter, exhaust valves Ds2 and Ds3 are closed and outlet switching valves Ds4 and Ds5 are opened so that cooling water within the downstream fluid passage after exhaust valves Ds2 and Ds3 is discharged with air.

Then, during a time period from the start of the mold open to completion of the same or completion of taking off a product, air switching valves As and Ab and steam inlet drain exhaust valves Ds1 and Ds1' are closed and steam inlet switching valves Sa and Sb are opened, whereby steam introduction is started.

If a time period during which outlet switching valves Ds4 and Ds5 are opened reaches a predetermined value or the temperature of the medium flowing in the fluid passage reaches a predetermined value, then outlet switching valves Ds4 and Ds5 are closed and steam pressure regulating valves Ds6 and Ds7 on the downstream are opened. Thus, the steam pressure is maintained.

If a time period during which steam inlet switching valves Sa and Sb are opened reaches a predetermined value or the temperature of the mold reaches a predetermined value, then a mold closing signal is generated to start closing of the mold of the injection molding machine. When the mold closing is completed, injection is started.

Now, how cooling water is introduced into the mold will be described.

When the injection process is completed, steam inlet switching valves Sa and Sb on the upstream side and steam pressure regulating valves Ds6 and Ds7 on the downstream are closed, and outlet switching valves Ds4 and Ds5 on the downstream side and cooling water inlet switching valves Wa, Wb on the upstream side are opened, whereby cooling water is introduced into the piping system and drain is discharged from the same. If a time period during which outlet switching valves Ds4 and Ds5 are opened reaches a predetermined value or the temperature of the medium flowing in the flow passage reaches a predetermined value, then outlet switching valves Ds4 and Ds5 on the downstream side are closed and outlet switching valves WRa and WRb on the downstream side are opened, whereby cooling water is recovered. If a predetermined time period has elapsed, then inlet switching valves Wa and Wb and outlet switching valves WRa and WRb are closed. Thus, processing goes to a step of discharging the cooling water in the flow passage with the air and a step of discharging drain in the upstream side flow passage with steam.

According to the present embodiment, when the supplied medium is changed from the cooling water to the steam, the cooling water is purged by air. However, the supplied medium may be changed directly from the cooling water to the steam without purging the cooling water with air.

As described-above, it is preferable for the step of closing the mold to be started at the midst of increase or completion of increase of temperature of the cavity surface up to a predetermined value owing to the heating medium supply, after the supplied medium is changed from the cooling medium to the heating medium and a predetermined time period has elapsed. If such scheme is effected, the time period during which the mold is opened or closed can also be utilized as a time period for increasing the temperature of the mold, which fact results in shortening of the molding process cycle. Moreover, heat transfer through a contact face between the stationary mold half and the movable mold half can be prevented. Therefore, the above-described scheme can be advantageously applied to a case where the stationary mold half and the movable mold half are set to different temperatures, respectively.

Furthermore, if the change of medium supply from the heating medium to the cooling medium is effected differently on the movable mold half and the stationary mold half, or alternatively, only one of the movable mold half and the stationary mold half is supplied with the heating medium, then a product taken off from the mold can be prevented from warpage or sink marks.

If a synthetic resin is shaped by repeatedly increasing or decreasing the temperature of the cavity surface, the temperature of the cavity surface upon heating is set to load-deflection temperature +(0 to 70)° C. at 4.6 kg/cm2 of a raw material resin, preferably +(0 to 50)° C., more preferably +(0 to 30)° C.

How the channel is preferably constructed near the cavity surface of the cavity block will hereinafter be described.

Figure 10:
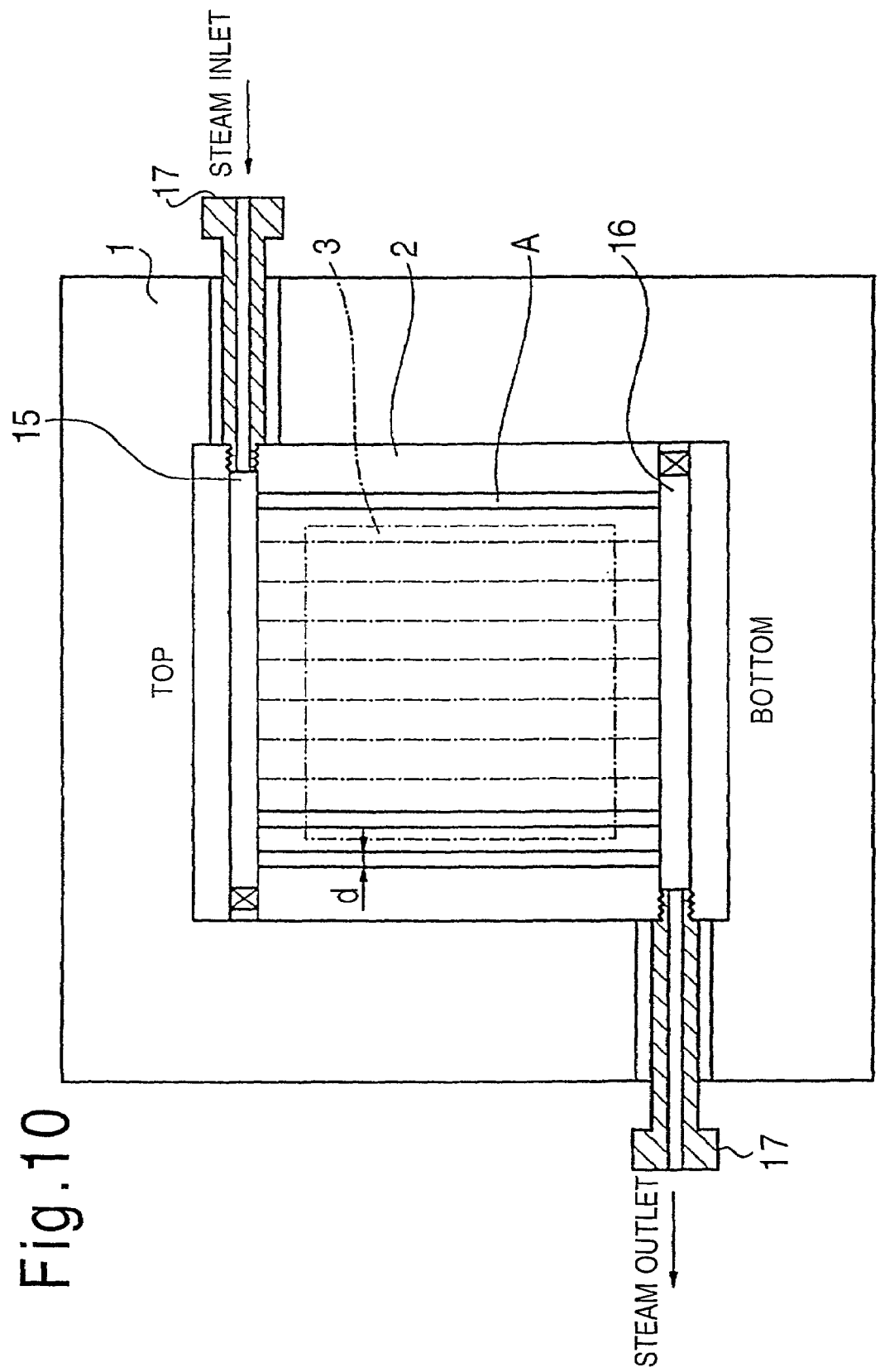
FIG. 10 is a diagram illustrative of how channels are arranged near the cavity surface.

As shown in FIG. 10, a plurality of channels are arranged in cavity block 2 so that the passages stand upright. Each upper end and lower end of the passages are connected to inlet slot 15 lying horizontally and outlet slot 16 also lying horizontally. A downstream end portion of inlet slot 15 and an upstream end portion of outlet slot 16 are sealed. When steam is introduced as a heating medium into the flow passages thus arranged, condensed water deriving from the steam can be discharged with ease owing to the action of gravity. Therefore, heat can be transferred with ease from the steam to a wall of the flow passage within the molding mold, with the result that the temperature of the cavity surface can be rapidly increased.

According to the above embodiment, inlet slot 15 and outlet slot 16 are provided within cavity block 2, and inlet slot 15 and outlet slot 16 are connected with conduits 17, respectively, which are thermally insulated from mold base 1 by means of an air layer. In this way, little heat flow is caused to mold base 1, and hence the temperature of cavity 3 can be increased rapidly. Further, since inlet slot 15 and outlet slot 16 are provided outside cavity 3, little influence will be effected from inlet slot 15 and outlet slot 16 to the temperature distribution within the cavity surface, with the result that dispersion of the temperature distribution becomes small.

It is preferable for plurality of channels A to have an equal hydraulic equivalent diameter d and equal effective length. In this way, a flow amount of medium flowing through the plurality of channel A provided near the cavity surface becomes uniform, which makes it possible to limit the dispersion of the temperature distribution of the cavity surface to a small range.

Further, hydraulic equivalent diameters D of inlet slot 15 and outlet slot 16 are set to one to three times the hydraulic equivalent diameter d of channel A. In this way, pressure loss of inlet slot 15 and outlet slot 16 becomes small, the temperature of the steam flowing into channel A provided near the cavity surface becomes uniform, and the dispersion of the temperature distribution of the cavity surface becomes small.

Figure 11:
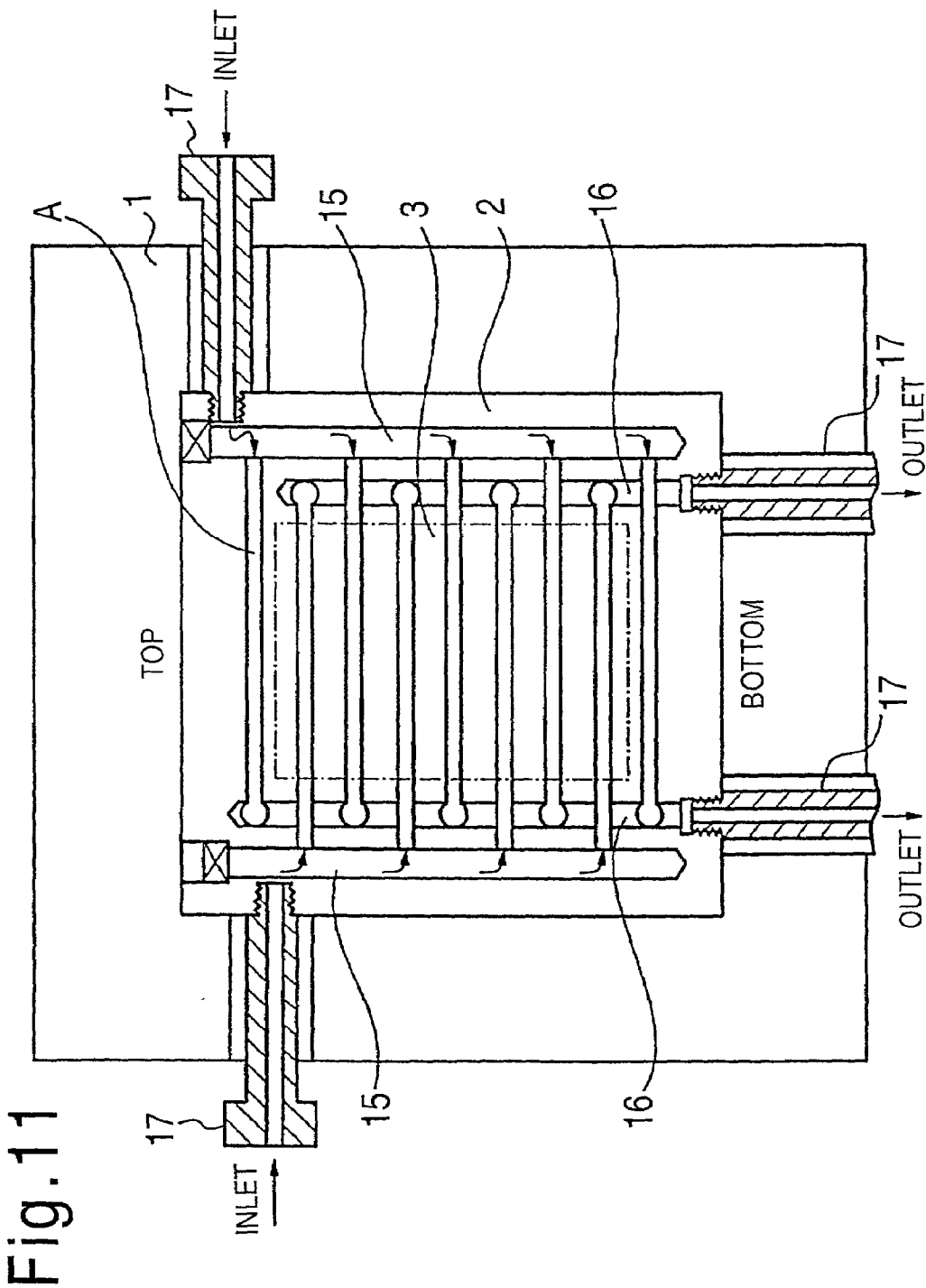
FIG. 11 is another diagram illustrative of how channels are arranged near the cavity surface.

Alternatively, the channel may be constructed near the cavity surface as shown in FIG. 11. That is, a pair of inlet slots 15 standing upright are provided near the right and left edges of the cavity block so as to oppose each other. Also, a pair of outlet slot 16 also standing upright are provided inside inlet slots 15 near the right and left edges of the cavity block so as to oppose each other. A plurality of channels A for cavity temperature adjustment are arrayed in parallel so as to extend from one inlet slot 15 to the other outlet slot 16 and be connected to inlet slot 15 and outlet slot 16. The plurality of channels A may be inclined downward to the downstream side. The upper and lower end portions of both inlet slots 15 and the upper end portions of both outlet slot 16 are sealed. Then, a medium is supplied from the upper end side of both inlet slots 15. According to this arrangement, the medium is supplied from both of the sides in an opposing fashion, and hence the distribution of the temperature of the cavity surface becomes uniform.

In the couple of examples of fluid passage construction, one cavity block is arranged to have the channel through which a heating medium and a cooling medium are alternately and repeatedly supplied and the slot thereof. However, the cavity block may be divided into a part having provided therein the channel through which a heating medium and a cooling medium are alternately and repeatedly supplied and a part having provided the slot. In this case, a medium sealing member such as an adhesive agent is provided at a face dividing the cavity block into the two parts.

According to the synthetic resin molding mold of the present invention, the cavity surface can be heated and cooled within a short period of time. Thus, the present invention can be advantageously applied to an in-mold coating in which a thermoplastic resin is injected into the mold and thereafter a thermosetting resin is injected into the same to obtain a painted product. That is, the thermosetting resin is injected into the mold according to the present invention, so as to coat the thermoplastic resin with the thermosetting resin. Then, a heating medium is supplied into the channels to cure the thermosetting resin, and thereafter a cooling medium is supplied into the channels to solidify the thermoplastic resin. Thus, the painted product can be obtained with ease.

Raw material resins molded by the mold according to the present invention may be amorphous polymer resin such as polyvinyl chloride (resin compounds including rigid resin and soft resin, the following materials are the same as above), acrylic ester resin (material containing acrylic acid, methacrylic acid and so on as an acid, and also containing methyl group and ethyl group and so on as an alkyl group), polystyrene (general purpose type, high impact resistant type and so on), acrylonitrile-butadiene-styrene resin, acrylonitrile-butadiene-styrene system resin, modified polyphenylene oxide, polycarbonate, polysulfone, polyarylate, polyether imide, polyether sulfone and so on, and crystalline polymer such as polyethylene (including low density, linear low density, medium density, high density and so on), polypropylene (such as homopolymer, random polymer, block polymer and so on), polybutene-1, polymethylpentene-1, polyfluorocarbon (polyvinylidene fluoride and so on), polyoxymethylene, polyamide (6, 66 and so on), terephthalic acid ester resin (polyethylene terephthalate, polybutylene terephthalate and so on), polyphenylene sulfide, polyether ether ketone, polyether ketone, polyimide and so on, liquid crystal polymer (aromatic polyester, aromatic polyester amide and so on), thermosetting resin such as epoxy resin, melamine resin, phenolic resin, urea resin, unsaturated polyester resin, polyurethane, silicone resin, alkyd resin, and alloys or filler (particle filler such as talc and so on or fiber material such as glass fiber and so on), and compounds of the above resins.

Further, a molding method to which the molding mold according to the present invention can be applied includes injection molding, transfer molding, compression molding, reaction injection molding, blow molding, thermoforming and so on. Furthermore, the injection molding includes, in addition to an ordinary injection molding, injection-compression molding, local oscillation pressurizing method, gas-press method, gas-assist method, hollow molding, sandwiching molding, two-color molding, in-mold method, push-pull molding, high-speed injection molding and so on.

INDUSTRIAL APPLICABILITY

As described above, the synthetic resin molding mold according to the present invention is useful as a mold for use with an injection molding, compression molding and so on of a thermoplastic resin, a thermosetting resin and so on, in which a cavity surface is alternately heated and cooled. Particularly, according to the mold of the present invention, heating is effected only on the cavity surface only when a melt is injected into the mold. Therefore, the fluidity of the resin is improved and hence a thin-walled product can be properly molded, the shape of the cavity surface can be satisfactorily replicated to a product, and weld line or the like becomes less conspicuous.

What is claimed is:

1. A synthetic resin molding mold comprising a mold base (1), a cavity block (2) having a cavity (3) provided within the mold base (1), a heat insulating layer (5) provided between the mold base (1) and the cavity block (2), which is defined by a recess formed on a surface of the cavity block (2), and a channel (A) provided near a cavity surface (4) through which a heating medium and a cooling medium are alternately and repeatedly supplied, wherein a space (t1) is provided at a contact portion between the mold base (1) and the cavity block (2) including the heat insulating layer (5) based on the anticipation of a thermal expansion of the cavity block (2).

2. The synthetic resin molding mold according to claim 1, wherein the space (t1) is set so that a thermal stress caused when the cavity block (2) is expanded becomes equal to or smaller than 200 MPa.

3. The synthetic resin molding mold according to claim 1, wherein a fixing portion with a gap (t2) smaller than the space (t1) is provided between the cavity block (2) and the mold base (1).

4. The synthetic resin molding mold according to claim 3, wherein the gap (t2) of the fixing portion is set to be in a range of from 1 to 30 μm.

5. The synthetic resin molding mold according to claim 1, wherein a surface of the cavity block (2) is larger than a surface (4) of the cavity (3).

6. The synthetic resin molding mold according to claim 1, wherein the heating medium is steam.

7. The synthetic resin molding mold according to claim 1, wherein a channel (A1) through which cooling medium is constantly supplied is provided in addition to the channel (A).

8. The synthetic resin molding mold according to claim 1, wherein the cavity block (2) is composed of a stationary mold half and a movable mold half, and at least one of the stationary mold half and the movable mold half is provided with the channel (A).

9. The synthetic resin molding mold according to claim 1, wherein the cavity (3) is arranged as a cubic body having a bottom wall surface and a side wall surface, two groups of the channel in which the channels (A) are arrayed at a pitch (P) and through which the heating medium and the cooling medium are alternately and repeatedly supplied, are separately provided near the bottom wall surface and the side wall surface of the cavity (3), and the distance (Pa) from the nearest passage of one channel group to the nearest passage of the other channel group is made smaller than the pitch (p) at which the channels (A) are arrayed in each channel group.

10. The synthetic resin molding mold according to claim 1, wherein the cavity (3) is arranged as a cubic body having a bottom wall surface and a side wall surface, two groups of the channel in which the channels (A) are arrayed at a pitch (p) and through which the heating medium and the cooling medium are alternately and repeatedly supplied, are separately provided near the bottom wall surface and the side wall surface of the cavity (3), the distance (Pa) from the nearest channel of one channel group to the nearest channel of the other channel group is larger than the pitch (p) at which the channels (A) are arrayed in each channel group, and a channel (A2) is additionally provided at an intersection or inside of the intersection of the array of the channels (A) along the bottom wall surface and the array of the channels (A) along the side wall surface of the cubic cavity (3).

11. The synthetic resin molding mold according to claim 1, wherein the channel (A) through which the heating medium and the cooling medium are alternately and repeatedly supplied is made to have a hydraulic equivalent diameter of 3 to 6 mm, and a distance (h) from a cavity surface (4) to a channel surface is set to 1 to 10 mm.

12. The synthetic resin molding mold according to claim 1, wherein the cavity block (2) has provided therein inlet and outlet slots (15,16) communicating with the channel (A), and the inlet and outlet slots (15,16) are attached with conduits (17) thermally insulated from the mold base (1).

13. The synthetic resin molding mold according to claim 12, wherein a hydraulic equivalent diameter of the slot (15,16) is set to one to three times the hydraulic equivalent diameter of the channel (A).

14. The synthetic resin molding mold according to claim 12, wherein the cavity block (2) is divided into a part having provided therein the channel (A) and a part having the slot (15,16) provided, and a medium sealing member is provided at a face dividing the cavity block (2) into two parts.

15. The synthetic resin molding mold according to claim 14, wherein the medium sealing member is formed of an adhesive agent.

16. A method of molding a synthetic resin comprising the steps of:

injecting a thermoplastic resin into a comprising a mold base (1), a cavity block (2) having a cavity (3) provided within the mold base (1), a heat insulating layer (5) provided between the mold base (1) and the cavity block (2), which is defined by a recess formed on a surface of the cavity block (2), and a channel (A) provided near a cavity surface (4) through which a heating medium and a cooling medium are alternately and repeatedly supplied, wherein the cavity block (2) has provided therein inlet and outlet slots (15,16) communicating with the channel (A), and the inlet and outlet slots (15,16) are attached with conduits (17) thermally insulated from the mold base (1) and wherein a space (t1) is provided at a contact portion between the mold base (1) and the cavity block (2) including the heat insulating layer (5) based on the anticipation of a thermal expansion of the cavity block (2);

injecting a thermosetting resin into the mold to coat the thermoplastic resin at the surface thereof with the thermosetting resin;

supplying a heating medium into the channel (A) to cure the thermosetting resin; and supplying a cooling medium into the channel (A) to cool the thermoplastic resin.

17. The synthetic resin molding mold according to claim 12, further comprising an inlet switching valve (Sa, Wa, Aa, Sb, Wb, Ab) and an outlet switching valve (Ds4, Ds5, WRa, WRb) are provided for selecting the supply of a heating medium and a cooling medium at an upstream inlet and a downstream outlet of the channel (A), and at least one exhaust valve (Ds2,Ds3) for discharging the heating medium, cooling medium and a gas is provided in the flow passage at a portion between the inlet switching valve (Sa, Wa, Aa, Sb, Wb, Ab) and the outlet switching valve (Ds4, Ds5, WRa, WRb).

18. The synthetic resin molding mold according to claim 17, wherein at least one inlet valve through which a purging gas is supplied is provided in the fluid passage at the portion between the inlet switching valve (Sa, Wa, Aa, Sb, Wb, Ab) and the outlet switching valve (Ds4, Ds5, WRa, WRb).

19. The synthetic resin molding mold according to claim 17, wherein a check valve (c) is provided on the downstream side of the inlet switching valve (Sa, Sb) for the heating medium.

20. A method of adjusting a temperature of a synthetic resin molding mold comprising a mold base (1), a cavity block (2) having a cavity (3) provided within the mold base (1), a heat insulating layer (5) provided between the mold base (1) and the cavity block (2), which is defined by a recess formed on a surface of the cavity block (2), and a channel (A) provided near a cavity surface (4) through which a heating medium and a cooling medium are alternately and repeatedly supplied, wherein the cavity block (2) has provided therein inlet and outlet slots (15.16) communicating with the channel (A), and the inlet and outlet slots (15,16) are attached with conduits (17) thermally insulated from the mold base (1) and wherein a space (t1) is provided at a contact portion between the mold base (1) and the cavity block (2) including the heat insulating layer (5) based on the anticipation of a thermal expansion of the cavity block (2), the method comprising a step of supplying a heating medium and a cooling medium into the channel (A) alternately and repeatedly so as to heat and cool the surface (4) of the cavity (3), wherein when the medium supply is changed from the cooling medium to the heating medium, at least one of exhaust valves (Ds2,Ds3) provided on the upstream side and the downstream side of the channel (A) is opened and the cooling medium left within the channel is discharged by a gas or the heating medium.

21. The method according to claim 20, wherein when the medium supply is changed from the heating medium to the cooling medium, a purging gas is supplied into the channel.

22. The method according to claim 20, wherein the supply of the heating medium starts at a timing point between the opening of the mold to the ejection of a molded product.

23. The method according to claim 22, wherein the mold is not closed until a predetermined time period has elapsed after the heating medium supply is started.

24. The method according to claim 22, wherein the mold is not closed until the heating medium is supplied to heat a surface (4) of the cavity (3) or complete the heating of the surface (4) of the cavity (3) up to a predetermined temperature.

25. The method according to claim 20, wherein the heating medium is steam.

26. A method of molding a synthetic resin comprising the steps of:

injecting a thermoplastic resin into a mold comprising a mold base (1), a cavity block (2) having a cavity (3) provided within the mold base (1), a heat insulating layer (5) provided between the mold base (1) and the cavity block (2), which is defined by a recess formed on a surface of the cavity block (2), and a channel (A) provided near a cavity surface (4) through which a heating medium and a cooling medium are alternately and repeatedly supplied, wherein a space (t1) is provided at a contact portion between the mold base (1) and the cavity block (2) including the heat insulating layer (5) based on the anticipation of a thermal expansion of the cavity block (2);

injecting a thermosetting resin into the mold to coat the thermoplastic resin at the surface thereof with the thermosetting resin;

supplying a heating medium into the channel (A) to cure the thermosetting resin; and supplying a cooling medium into the channel (A) to cool the thermoplastic resin.

27. The synthetic resin molding mold according to claim 1, further comprising an inlet switching valve (Sa, Wa, Aa, Sb, Wb, Ab) and an outlet switching valve (Ds4, Ds5, WRa, WRb) are provided for selecting the supply of a heating medium and a cooling medium at an upstream inlet and a downstream outlet of the channel (A), and at least one exhaust valve (Ds2,Ds3,) for discharging the heating medium, cooling medium and a gas is provided in the flow passage at a portion between the inlet switching valve (Sa, Wa, Aa, Sb, Wb, Ab) and the outlet switching valve (Ds4, Ds5, WRa, WRb).

28. The synthetic resin molding mold according to claim 27, wherein at least one inlet valve through which a purging gas is supplied is provided in the fluid passage at the portion between the inlet switching valve (Sa, Wa, Aa, Sb, Wb, Ab) and the outlet switching valve (Ds4, Ds5, WRa, WRb).

29. The synthetic resin molding according to claim 27, wherein a check valve (c) is provided on the downstream side of the inlet switching valve (Sa, Sb) for the heating medium.

30. A method of adjusting a temperature of a synthetic resin molding mold comprising a mold base (1), a cavity block (2) having a cavity (3) provided within the mold base (1), a heat insulating layer (5) Provided between the mold base (1) and the cavity block (2), which is defined by a recess formed on a surface of the cavity block (2), and a channel (A) provided near a cavity surface (4) through which a heating medium and a cooling medium are alternately and repeatedly supplied, wherein a space (t1) is provided at a contact portion between the mold base (1) and the cavity block (2) including the heat insulating layer (5) based on the anticipation of a thermal expansion of the cavity block (2), the method comprising a step of supplying a heating medium and a cooling medium into the channel (A) alternately and repeatedly so as to heat and cool the surface (4) of the cavity (3), wherein when the medium supply is changed from the cooling medium to the heating medium, at least one of exhaust valves (Ds2,Ds3) provided on the upstream side and the downstream side of the channel (A) is opened and the cooling medium left within the channel is discharged by a gas or the heating medium.

31. The method according to claim 30, wherein when the medium supply is changed from the heating medium to the cooling medium, a purging gas is supplied into the channel.

32. The method according to claim 30, wherein the supply of the heating medium starts at a timing point between the opening of the mold to the ejection of a molded product.

33. The method according to claim 32, wherein the mold is not closed until a predetermined time period has elapsed after the heating medium supply is started.

34. The method according to claim 32, wherein the mold is not closed until the heating medium is supplied to heat a surface (4) of the cavity (3) or complete the heating of the surface (4) of the cavity (3) up to a predetermined temperature.

35. The method according to claim 30, wherein the heating medium is steam.

* * * * *